United States Patent [19]
Mills

[11] Patent Number: 4,737,720
[45] Date of Patent: Apr. 12, 1988

[54] DTMF GENERATION USING PRE-SUMMED TABLES

[75] Inventor: Kenneth R. Mills, N. Syracuse, N.Y.

[73] Assignee: General Electric Company, Fairfield, Conn.

[21] Appl. No.: 816,509

[22] Filed: Jan. 6, 1986

[51] Int. Cl.[4] .................. H03B 19/00; H03K 17/00
[52] U.S. Cl. .................................... 328/14; 307/271; 307/522; 307/529; 328/27; 328/15; 328/150
[58] Field of Search ............... 307/271, 522, 524, 529; 328/14, 15, 16, 27, 136, 140, 150; 375/8; 455/76; 381/101

[56] References Cited

U.S. PATENT DOCUMENTS

| | | | |
|---|---|---|---|
| 3,706,855 | 12/1972 | Pitroda et al. | 379/283 |
| 4,039,806 | 8/1977 | Fredriksson | 235/152 |
| 4,058,805 | 11/1977 | Lake | 328/14 |
| 4,087,638 | 5/1978 | Hayes et al. | 179/2 E |
| 4,142,184 | 2/1979 | Lake | 340/347 DA |
| 4,346,448 | 8/1982 | Insom et al. | 364/607 |
| 4,518,920 | 5/1985 | Warner et al. | 328/14 |
| 4,622,690 | 11/1986 | Smith, III et al. | 381/31 |

*Primary Examiner*—Stanley D. Miller
*Assistant Examiner*—Richard Roseen
*Attorney, Agent, or Firm*—Paul J. Rasmussen; Peter M. Emanuel; Thomas F. Lenihan

[57] ABSTRACT

A technique for generating predefined dual tone, multiple frequency signals composed of two non-harmonically related frequency components according to industry standards is disclosed. The frequencies of each tone pair are adjusted within a predetermined tolerance so that their peaks are time coincident within a minimum number of cycles. A sampling frequency for the adjusted frequency tone pair is selected to be synchronized with the occurance of the time coincident peaks of the tone pair. The adjusted frequency tone pair are summed and then sampled at the selected sampling frequency and stored in a table in a digital memory. The digital memory contains a plurality of tables, one for each sampled summed tone pair, and the tables are variable in length being optimized for the summed tone pair stored in the table. In order to generate a desired dual tone, multiple frequency signal, the table in memory containing the desired summed tone pair is bidirectionally scanned at a scanning rate equal to the sampling frequency for that tone pair to read out the samples in repeating sequence. The samples are then converted to an analog signal approximating the desired dual tone, multiple frequency signal.

24 Claims, 3 Drawing Sheets

WAVEFORM OF SUMMED COMPONENTS, AND STORED TABLE (25 BYTES)

DESIRED 697 AND 1209 Hz COMPONENTS

697 AND 1209 Hz COMPONENTS STARTED AT PEAKS WITH SUBSEQUENT PEAKS INDICATED
(PEAKS ARE POINTS WHERE SCANNING CAN REVERSE WITHOUT PRODUCING DISCONTINUITY)

POTENTIAL SAMPLING RATES

20 μSEC

50 μSEC

100 μSEC

120 μSEC

140 μSEC

200 μSEC

FIG. 4

COMPONENTS OPTIMIZED FOR 120 μSEC SAMPLE RATE (694.4445 & 1215.287 Hz) THIS ELIMINATES SMALL END DISCONTINUITIES WHICH WOULD OCCUR IF THE COMPONENTS' END POINTS DID NOT OCCUR EXACTLY IN SYNC WITH THE SAMPLE RATE

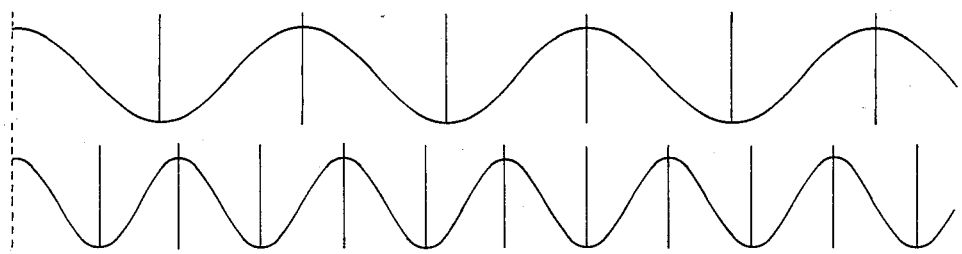

FIG. 5

COMPONENTS AS THEY WOULD APPEAR IF STORED INDIVIDUALLY AT A 120 μSEC SAMPLE RATE. NOTE: SAMPLED WAVEFORM IS STORED WITH A 1/2 SAMPLE TIME PHASE SHIFT 1/2 OF EACH END SAMPLE MAKES UP PART OF THE REVERSE DIRECTION'S SCAN

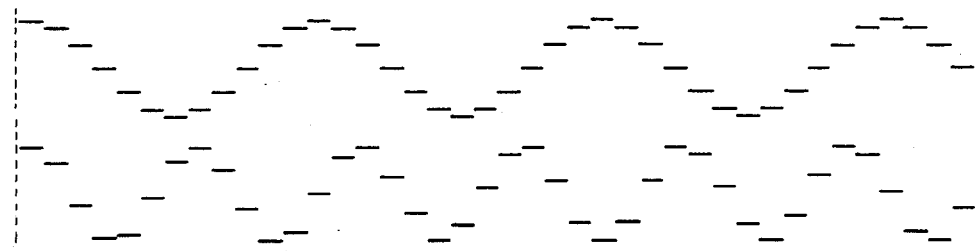

FIG. 6

WAVEFORM OF SUMMED COMPONENTS, AND STORED TABLE (25 BYTES)

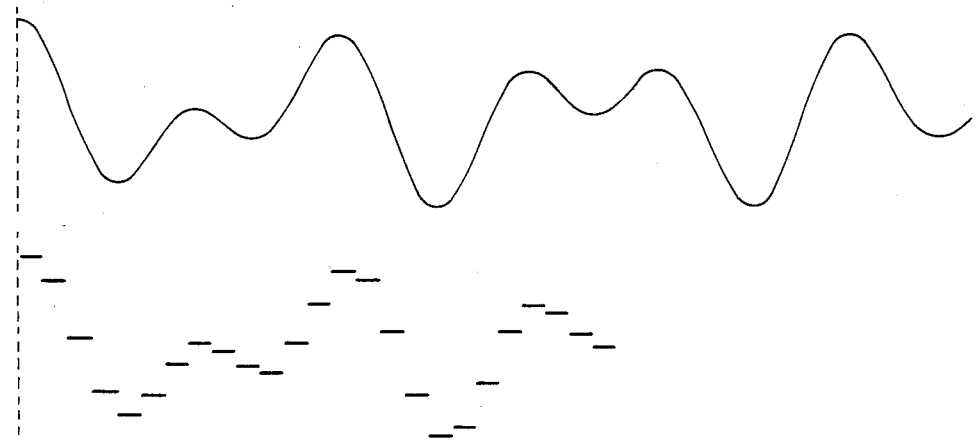

DTMF GENERATION USING PRE-SUMMED TABLES

FIELD OF THE INVENTION

The present invention generally relates to the generation of dual tone, multiple frequency (DTMF) signals and, more particularly, to DTMF generation using pre-summed tables of individually optimized length, tailored for bidirectional fixed rate scanning.

DESCRIPTION OF THE PRIOR ART

The art of generating waveforms through the use of look up tables is well known. For example, U.S. Pat. No. 4,058,805 to Lake is representative of systems which use look up table storage of the discrete dual frequencies necessary to generate a dual tone, multiple frequency (DTMF) tone. In such systems, the individual tone data must be separately read from their individual look up tables, and then the data must be summed either before or after digital-to-analog conversion in order to generate the desired DTMF signal.

In U.S. Pat. No. 3,706,855 to Pitroda et al discloses a method and apparatus for generating digital code signals representing dual frequency analog tones through the use of look up tables. Pitroda et al specifically teach the generation of fifteen dual frequency tones, all of which have an even one quarter period of ten milliseconds; that is, the one quarter period waveform repeats, with a change in sign or direction, every ten milliseconds. Thus, only the one quarter period waveform need be stored in memory to recreate the tone. To generate all fifteen tones, based on a sampling rate of 125 microseconds, one 80 digital samples of each tone need be stored. To recreate a specific tone, the memory containing its one quarter period sample is read cyclically in a predetermined manner.

As standardized in the communications industry, DTMF frequencies were originally designed not to be harmonics of one another so that they would not be accidently produced as in speech. As a result, they do not have coincident peaks within a small number of cycles. The standards for DTMF tones are published in Bell System Technical Reference PUB 61100 by AT&T dated January 1983.

The approach taken by Pitroda et al is to store and generate periodically related tones which does not conform to the industry standard for DTMF signals. Adapting the Pitroda et al technique to non-harmonically related frequency pairs would require a large number of samples to be stored in memory and a relatively high performance, and hence expensive, microprocessor to read out the samples in order to generate the DTMF signals. What is needed is a technique by which a low cost microprocessor, with minimal memory and relatively slow execution speed, could be made to generate high quality DTMF signals.

SUMMARY OF THE INVENTION

It is therefore an object of this invention to provide an inexpensive signal generator which produces high quality DTMF signals.

It is another object of the present invention to provide a DTMF signal generator using digital storage techniques but requiring minimal processing by inexpensive circuits of the tone data read out of the digital storage.

It is a further object of the invention to provide a digital DTMF signal generator which the data is optimized to compensate for the actual circuit performance of inexpensive analog circuits used filter the generated DTMF signals.

According to the invention, pre-summed tables of individually optimized length, tailored for bidirectional fixed rate scanning, are used to generate DTMF signals of high quality. Pre-summed waveform tables are chosen to eliminate the need for real time summing, either internal or external. The novel aspect of the invention is to have each table be a unique length and to run between the points where both components have simultaneously reached their peak (positive or negative exteme). Specifying the end points this way and using different length tables for each tone pair allows the tables to be scanned bidirectionally at an essentially fixed rate while minimizing the lengths of the tables. While each table does not need its own scan rate, it is possible to optimize the design further by grouping the tables into two or three different scan rates.

A further aspect of the invention is the possibility of preweighting the two components before they are pre-summed. The relative amplitude difference between any two frequency components (twist) which make up a valid DTMF pair, as defined by AT&T PUB 61100, is restricted as follows: The maximum difference in levels between the two components must not exceed 4 dB, and the level of the high-frequency component must equal or exceed the level of the low frequency component. A low pass filter is needed to reduce the relative amplitude of extraneous signals produced by the digital sampling used in the method of DTMF signal generation according to the invention. This filter can be more efficient if it does not need to be completely flat over the range of valid frequency components. By preweighting the two components before they are pre-summed, a 2 dB twist can be achieved, and a less expensive filter can be used. This feature of the invention enhances the overall performance without any increase, and in some cases an actual decrease, in cost of the system.

BRIEF DESCRIPTION OF THE DRAWINGS

The foregoing and other objects, aspects and advantages of the invention will be better understood from the following detailed description of the invention with reference to the drawings, in which:

FIG. 4 is a waveform diagram showing the two components of FIG. 2 adjusted in frequency to match each other and a sample rate of 120 $\mu$sec.;

FIG. 5 is a sampled waveform diagram showing the two components as they would appear if stored individually at the 120 $\mu$sec. rate;

FIG. 6 is a waveform and sampled waveform diagram showing the summed DTMF signal and the final twenty-five step stored table, respectively, according to the invention;

FIGS. 9–11 illustrate flowcharts useful in understanding the invention.

DETAILED DESCRIPTION OF A PREFERRED EMBODIMENT OF THE INVENTION

Figure 1:
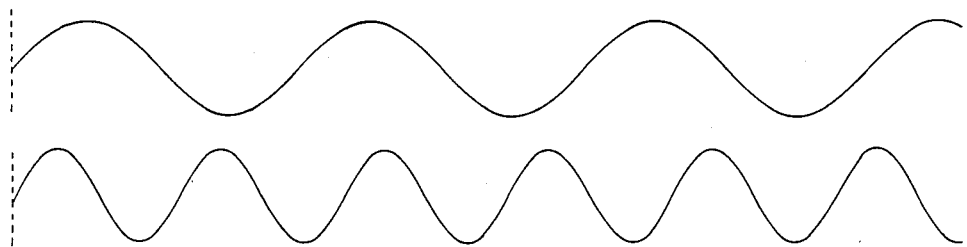
FIG. 1 is a waveform diagram showing the components which make up a DTMF "1" tone pair.

Referring now to the drawings, and more particularly to FIG. 1, there are shown the waveforms of two sinusoidal signals, one having a frequency of 697 Hz and the other having a frequency of 1209 Hz. These two signals are the components which, when summed, make up the DTMF tone pair for the digit "1" according to the industry standard. The invention will be described primarily with reference to these two components, but those skilled in the art will understand that the process described is readily applied to the other tones in the DTMF standard.

Figure 2:
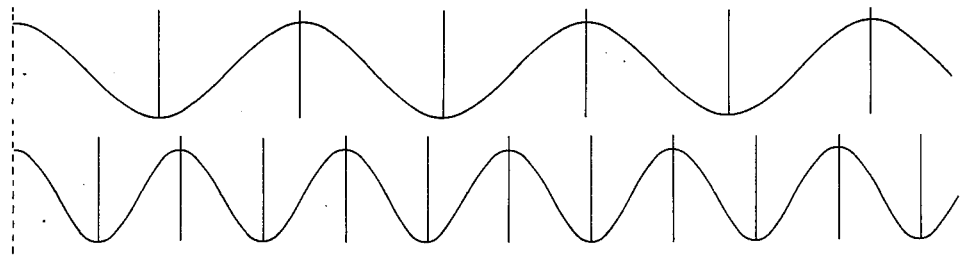
FIG. 2 is a waveform diagram showing the same two components starting at their positive peaks with their subsequent peaks indicated by vertical lines.

FIG. 2 shows the same two components both starting at their positive peaks with their subsequent peaks indicated by vertical lines. It is, of course, possible to generate either of these frequencies by scanning a table back and forth between their two peaks. In order to generate the sum of the two frequencies by a similar method, a pre-summed table is created starting and ending at points where scanning of each of the components could be reversed. Since DTMF frequencies are not harmonics, they do not "line up" perfectly, i.e. have coincident peaks, within a small number of cycles. They do, however, come close to lining up within a reasonable number of cycles. In order to store these two components pre-summed in one table, their frequencies are shifted slightly so that their end points become exactly coincident. This step eliminates distortion which would otherwise be difficult and expensive to filter out.

Figure 3:
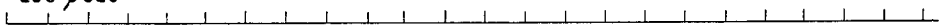
FIG. 3 is a timing diagram showing some examples of sampling rates which could be used to store versions of the waveforms shown in FIG. 2 or their sum.

FIG. 3 shows some examples of sampling rates which could be used to store versions of the waveforms shown in FIG. 2 or their sum. In general, a lower sampling rate uses fewer steps to reach a given end point and therefore uses less memory; it also produces sampling distortion which is closer to the frequencies of interest and, therefore, more difficult and expensive to filter out. The frequencies shown in FIG. 2, however, need to be shifted not only so that their endpoints will match each other but also so that their endpoints will match the sampling rate, again to reduce distortion. Therefore, the amount of shift required is also a function of the sampling rate. The frequencies of FIG. 2 are allowed to shift no more than 1% and, as a result, the 120 microsecond sampling rate may be matched to the two components within twenty-four steps whereas the 140 microsecond sampling rate would take forty-one steps to achieve a similar match. Viewing FIGS. 2 and 3, possibly with the help of a straight edge, shows the reason for this to some extent.

The following is the listing for a BASIC program which calculates the number of steps (excluding end point) which need to be stored in order to reproduce a given DTMF pair. This program takes into account the frequency tolerance which is allowable and yields the number of steps required versus the sampling rate. The flowchart of FIG. 9 corresponds to the program steps of Program 1.

PROGRAM I

```
10 DIM FREQ(10)
20 DATA 697,770,852,941,1209,1336,1477
30 FOR X=1 TO 7 : READ FREQ(X) : NEXT X
40 FOR C=5 TO 7 : FOR R=1 TO 4
45 LPRINT CHR$(12)
50 IT=.000004:LPRINT ,"INSTRUCTION TIME = 4 uS"
60 FT=1 : LPRINT ,"FREQUENCY TOLERANCE=";FT;"%"
70 LPRINT ,"COLUMN";C-4,"ROW";R
75 LPRINT ,FREQ(C),FREQ(R)
80 FOR IPS=17 TO 50:ST=IPS*IT:TBYTES=0:FLAG2=0
90 LPRINT : LPRINT ,ST*1000000!;"uS/STEP",
100 REM LPRINT "ROW=";FREQ(R),"COL=";FREQ(C)
110 FLAG=0 : FOR HP1=1 TO 200*ST*FREQ(R) : IF FLAG=1 THEN 210
120 T=HP1/(FREQ(R)*2) : TST=(INT((T/ST)+.5)*ST)
130 F1=1/(2*TST/HP1) : EF1=(INT(1000*((FREQ(R)-F1)/FREQ(R)))/10)
140 IF ABS(EF1)>FT THEN 210
150 HP2=INT((TST*2*FREQ(C))+.5)
160 F2=1/(2*TST/HP2) : EF2=(INT(1000*((FREQ(C)-F2)/FREQ(C)))/10)
170 IF ABS(EF2)>FT THEN 210
180 FLAG=1 : FLAG2=FLAG2+1 : TBYTES=TBYTES+TST/ST
190 ZT=INT(TST*1000000!)
200 REM LPRINT TST/ST;"STEPS";ZT;"uSEC", FL;HP1;F2;HP2,EF1;EF2
210 NEXT HP1 : IF FLAG2=1 THE LPRINT TBYTES;
220 NEXT IPS : NEXT R : NEXT C : END
```

Tables I to XII show sample runs for all twelve DTMF tone pairs using a step increment of four microseconds. Dramatic differences in the number of steps required versus sampling rate can be seen in all the frequency pairs. The example shown in FIG. 2 of 1209 Hz and 697 Hz at 120 microseconds versus 140 microseconds can be seen in Table I. Notice here that an even greater difference occurs between 120 microseconds and 124 microseconds.

TABLE I

| INSTRUCTION TIME = 4 uS FREQUENCY TOLERANCE = 1% | | |
|---|---|---|
| COLUMN 1 | | ROW 1 |
| 1209 | | 697 |
| 68 | uS/STEP | |
| 72 | uS/STEP | 40 |
| 76 | uS/STEP | 38 |
| 80 | uS/STEP | 36 |
| 84 | uS/STEP | 93.99999 |
| 88 | uS/STEP | 57 |
| 92 | uS/STEP | 86.00001 |
| 96 | uS/STEP | 30 |
| 100 | uS/STEP | 29 |
| 104 | uS/STEP | 48 |
| 108 | uS/STEP | 73 |
| 112 | uS/STEP | 70 |
| 116 | uS/STEP | 25 |
| 120 | uS/STEP | 24 |
| 124 | uS/STEP | 64 |
| 128 | uS/STEP | 39 |
| 132 | uS/STEP | 38 |
| 136 | uS/STEP | 58.00001 |
| 140 | uS/STEP | 41 |
| 144 | uS/STEP | 20 |
| 148 | uS/STEP | 39 |
| 152 | uS/STEP | 19 |
| 156 | uS/STEP | 32 |
| 160 | uS/STEP | 18 |
| 164 | uS/STEP | 35 |
| 168 | uS/STEP | 47 |
| 172 | uS/STEP | 29 |
| 176 | uS/STEP | 45 |
| 180 | uS/STEP | 16 |
| 184 | uS/STEP | 43.00001 |
| 188 | uS/STEP | 42 |
| 192 | uS/STEP | 15 |

TABLE I-continued

INSTRUCTION TIME = 4 uS
FREQUENCY TOLERANCE = 1%

| COLUMN 1<br>1209 | | ROW 1<br>697 |
|---|---|---|
| 196 | uS/STEP | 40 |
| 200 | uS/STEP | 25 |

TABLE II

INSTRUCTION TIME = 4 uS
FREQUENCY TOLERANCE = 1%

| COLUMN 1<br>1209 | | ROW 2<br>770 |
|---|---|---|
| 68 | uS/STEP | 67 |
| 72 | uS/STEP | 63 |
| 76 | uS/STEP | 60 |
| 80 | uS/STEP | 41 |
| 84 | uS/STEP | 39 |
| 88 | uS/STEP | 52 |
| 92 | uS/STEP | 49 |
| 96 | uS/STEP | 47 |
| 100 | uS/STEP | 58 |
| 104 | uS/STEP | 44 |
| 108 | uS/STEP | 42 |
| 112 | uS/STEP | 41 |
| 116 | uS/STEP | 39 |
| 120 | uS/STEP | 38 |
| 124 | uS/STEP | 37 |
| 128 | uS/STEP | 61 |
| 132 | uS/STEP | 44 |
| 136 | uS/STEP | 43 |
| 140 | uS/STEP | 56 |
| 144 | uS/STEP | 63 |
| 148 | uS/STEP | 31 |
| 152 | uS/STEP | 30 |
| 156 | uS/STEP | 21 |
| 160 | uS/STEP | 41 |
| 164 | uS/STEP | 20 |
| 168 | uS/STEP | 27 |
| 172 | uS/STEP | 34 |
| 176 | uS/STEP | 26 |
| 180 | uS/STEP | 51 |
| 184 | uS/STEP | 49 |
| 188 | uS/STEP | 24 |
| 192 | uS/STEP | 37 |
| 196 | uS/STEP | 23 |
| 200 | uS/STEP | 29 |

TABLE III

INSTRUCTION TIME = 4 uS
FREQUENCY TOLERANCE = 1%

| COLUMN 1<br>1209 | | ROW 3<br>852 |
|---|---|---|
| 68 | uS/STEP | 43 |
| 72 | uS/STEP | 57 |
| 76 | uS/STEP | 54 |
| 80 | uS/STEP | 73 |
| 84 | uS/STEP | 49.00001 |
| 88 | uS/STEP | 47 |
| 92 | uS/STEP | 45 |
| 96 | uS/STEP | 43 |
| 100 | uS/STEP | 41 |
| 104 | uS/STEP | 28 |
| 108 | uS/STEP | 27 |
| 112 | uS/STEP | 26 |
| 116 | uS/STEP | 46 |
| 120 | uS/STEP | 59 |
| 124 | uS/STEP | 43 |
| 128 | uS/STEP | 32 |
| 132 | uS/STEP | 53 |
| 136 | uS/STEP | 43 |
| 140 | uS/STEP | 50 |
| 144 | uS/STEP | 37 |
| 148 | uS/STEP | 28 |
| 152 | uS/STEP | 27 |
| 156 | uS/STEP | 45 |
| 160 | uS/STEP | 44 |

TABLE III-continued

INSTRUCTION TIME = 4 uS
FREQUENCY TOLERANCE = 1%

| COLUMN 1<br>1209 | | ROW 3<br>852 |
|---|---|---|
| 164 | uS/STEP | 25 |
| 168 | uS/STEP | 42 |
| 172 | uS/STEP | 17 |
| 176 | uS/STEP | 40 |
| 180 | uS/STEP | 23 |
| 184 | uS/STEP | 29 |
| 188 | uS/STEP | 22 |
| 192 | uS/STEP | 37 |
| 196 | uS/STEP | 21 |
| 200 | uS/STEP | 35 |

TABLE IV

INSTRUCTION TIME = 4 uS
FREQUENCY TOLERANCE = 1%

| COLUMN 1<br>1209 | | ROW 4<br>941 |
|---|---|---|
| 68 | uS/STEP | 55 |
| 72 | uS/STEP | 52 |
| 76 | uS/STEP | 49 |
| 80 | uS/STEP | 73 |
| 84 | uS/STEP | 44 |
| 88 | uS/STEP | 42 |
| 92 | uS/STEP | 58 |
| 96 | uS/STEP | 39 |
| 100 | uS/STEP | 37 |
| 104 | uS/STEP | 36 |
| 108 | uS/STEP | 54 |
| 112 | uS/STEP | 33 |
| 116 | uS/STEP | 32 |
| 120 | uS/STEP | 31 |
| 124 | uS/STEP | 30 |
| 128 | uS/STEP | 29 |
| 132 | uS/STEP | 28 |
| 136 | uS/STEP | 43 |
| 140 | uS/STEP | 53 |
| 144 | uS/STEP | 26 |
| 148 | uS/STEP | 25 |
| 152 | uS/STEP | 49 |
| 156 | uS/STEP | 24 |
| 160 | uS/STEP | 60 |
| 164 | uS/STEP | 45 |
| 168 | uS/STEP | 22 |
| 172 | uS/STEP | 31 |
| 176 | uS/STEP | 21 |
| 180 | uS/STEP | 41 |
| 184 | uS/STEP | 29 |
| 188 | uS/STEP | 20 |
| 192 | uS/STEP | 39 |
| 196 | uS/STEP | 19 |
| 200 | uS/STEP | 29 |

TABLE V

INSTRUCTION TIME = 4 uS
FREQUENCY TOLERANCE = 1%

| COLUMN 2<br>1336 | | ROW 1<br>697 |
|---|---|---|
| 68 | uS/STEP | |
| 72 | uS/STEP | |
| 76 | uS/STEP | 94 |
| 80 | uS/STEP | 99 |
| 84 | uS/STEP | 85 |
| 88 | uS/STEP | 73 |
| 92 | uS/STEP | 78 |
| 96 | uS/STEP | 67 |
| 100 | uS/STEP | 79 |
| 104 | uS/STEP | 69 |
| 108 | uS/STEP | 66 |
| 112 | uS/STEP | 64 |
| 116 | uS/STEP | 68 |
| 120 | uS/STEP | 66 |
| 124 | uS/STEP | 64 |
| 128 | uS/STEP | 50 |

TABLE V-continued

INSTRUCTION TIME = 4 uS
FREQUENCY TOLERANCE = 1%

| COLUMN 2 1336 | | ROW 1 697 |
|---|---|---|
| 132 | uS/STEP | 54 |
| 136 | uS/STEP | 58.00001 |
| 140 | uS/STEP | 51 |
| 144 | uS/STEP | 55.00001 |
| 148 | uS/STEP | 48 |
| 152 | uS/STEP | 47 |
| 156 | uS/STEP | 41 |
| 160 | uS/STEP | 40 |
| 164 | uS/STEP | 39 |
| 168 | uS/STEP | 47 |
| 172 | uS/STEP | 46 |
| 176 | uS/STEP | 45 |
| 180 | uS/STEP | 44 |
| 184 | uS/STEP | 39 |
| 188 | uS/STEP | 38 |
| 192 | uS/STEP | 37 |
| 196 | uS/STEP | 40 |
| 200 | uS/STEP | 32 |

TABLE VI

INSTRUCTION TIME = 4 uS
FREQUENCY TOLERANCE = 1%

| COLUMN 2 1336 | | ROW 2 770 |
|---|---|---|
| 68 | uS/STEP | |
| 72 | uS/STEP | 63 |
| 76 | uS/STEP | 94 |
| 80 | uS/STEP | 65 |
| 84 | uS/STEP | 31 |
| 88 | uS/STEP | 59 |
| 92 | uS/STEP | 49 |
| 96 | uS/STEP | 47 |
| 100 | uS/STEP | 26 |
| 104 | uS/STEP | 25 |
| 108 | uS/STEP | 42 |
| 112 | uS/STEP | 64 |
| 116 | uS/STEP | 39 |
| 120 | uS/STEP | 65 |
| 124 | uS/STEP | 21 |
| 128 | uS/STEP | 41 |
| 132 | uS/STEP | 54 |
| 136 | uS/STEP | 72 |
| 140 | uS/STEP | 51 |
| 144 | uS/STEP | 63 |
| 148 | uS/STEP | 48 |
| 152 | uS/STEP | 47 |
| 156 | uS/STEP | 29 |
| 160 | uS/STEP | 49 |
| 164 | uS/STEP | 16 |
| 168 | uS/STEP | 27 |
| 172 | uS/STEP | 57 |
| 176 | uS/STEP | 55 |
| 180 | uS/STEP | 29 |
| 184 | uS/STEP | 39 |
| 188 | uS/STEP | 24 |
| 192 | uS/STEP | 37 |
| 196 | uS/STEP | 23 |
| 200 | uS/STEP | 13 |

TABLE VII

INSTRUCTION TIME = 4 uS
FREQUENCY TOLERANCE = 1%

| COLUMN 2 1336 | | ROW 3 852 |
|---|---|---|
| 68 | uS/STEP | 60 |
| 72 | uS/STEP | 57 |
| 76 | uS/STEP | 54 |
| 80 | uS/STEP | 51 |
| 84 | uS/STEP | 49.00001 |
| 88 | uS/STEP | 47 |
| 92 | uS/STEP | 45 |
| 96 | uS/STEP | 43 |

TABLE VII-continued

INSTRUCTION TIME = 4 uS
FREQUENCY TOLERANCE = 1%

| COLUMN 2 1336 | | ROW 3 852 |
|---|---|---|
| 100 | uS/STEP | 41 |
| 104 | uS/STEP | 68 |
| 108 | uS/STEP | 38 |
| 112 | uS/STEP | 37 |
| 116 | uS/STEP | 61 |
| 120 | uS/STEP | 34 |
| 124 | uS/STEP | 33 |
| 128 | uS/STEP | 32 |
| 132 | uS/STEP | 31 |
| 136 | uS/STEP | 30 |
| 140 | uS/STEP | 54 |
| 144 | uS/STEP | 49 |
| 148 | uS/STEP | 28 |
| 152 | uS/STEP | 27 |
| 156 | uS/STEP | 41 |
| 160 | uS/STEP | 33 |
| 164 | uS/STEP | 25 |
| 168 | uS/STEP | 42 |
| 172 | uS/STEP | 24 |
| 176 | uS/STEP | 30 |
| 180 | uS/STEP | 23 |
| 184 | uS/STEP | 45 |
| 188 | uS/STEP | 22 |
| 192 | uS/STEP | 37 |
| 196 | uS/STEP | 21 |
| 200 | uS/STEP | 32 |

TABLE VIII

INSTRUCTION TIME = 4 uS
FREQUENCY TOLERANCE = 1%

| COLUMN 2 1336 | | ROW 4 941 |
|---|---|---|
| 68 | uS/STEP | 55 |
| 72 | uS/STEP | 52 |
| 76 | uS/STEP | 49 |
| 80 | uS/STEP | 33 |
| 84 | uS/STEP | 63 |
| 88 | uS/STEP | 30 |
| 92 | uS/STEP | 69 |
| 96 | uS/STEP | 39 |
| 100 | uS/STEP | 64 |
| 104 | uS/STEP | 36 |
| 108 | uS/STEP | 49 |
| 112 | uS/STEP | 47 |
| 116 | uS/STEP | 32 |
| 120 | uS/STEP | 22 |
| 124 | uS/STEP | 30 |
| 128 | uS/STEP | 29 |
| 132 | uS/STEP | 20 |
| 136 | uS/STEP | 47 |
| 140 | uS/STEP | 53 |
| 144 | uS/STEP | 26 |
| 148 | uS/STEP | 43 |
| 152 | uS/STEP | 42 |
| 156 | uS/STEP | 24 |
| 160 | uS/STEP | 33 |
| 164 | uS/STEP | 39 |
| 168 | uS/STEP | 38 |
| 172 | uS/STEP | 37 |
| 176 | uS/STEP | 15 |
| 180 | uS/STEP | 44 |
| 184 | uS/STEP | 43.00001 |
| 188 | uS/STEP | 14 |
| 192 | uS/STEP | 33 |
| 196 | uS/STEP | 19 |
| 200 | uS/STEP | 32 |

TABLE IX

INSTRUCTION TIME = 4 uS
FREQUENCY TOLERANCE = 1%

| COLUMN 3 1477 | | ROW 1 697 |
|---|---|---|
| 68 | uS/STEP | 74 |
| 72 | uS/STEP | 70 |
| 76 | uS/STEP | 76 |
| 80 | uS/STEP | 63 |
| 84 | uS/STEP | 60.00001 |
| 88 | uS/STEP | 65 |
| 92 | uS/STEP | 55.00001 |
| 96 | uS/STEP | 60 |
| 100 | uS/STEP | 57 |
| 104 | uS/STEP | 55 |
| 108 | uS/STEP | 53 |
| 112 | uS/STEP | 45 |
| 116 | uS/STEP | 56 |
| 120 | uS/STEP | 42 |
| 124 | uS/STEP | 46 |
| 128 | uS/STEP | 45 |
| 132 | uS/STEP | 49 |
| 136 | uS/STEP | 37 |
| 140 | uS/STEP | 36 |
| 144 | uS/STEP | 35 |
| 148 | uS/STEP | 34 |
| 152 | uS/STEP | 38 |
| 156 | uS/STEP | 37 |
| 160 | uS/STEP | 36 |
| 164 | uS/STEP | 35 |
| 168 | uS/STEP | 30 |
| 172 | uS/STEP | 63 |
| 176 | uS/STEP | 61 |
| 180 | uS/STEP | 28 |
| 184 | uS/STEP | 31 |
| 188 | uS/STEP | 27 |
| 192 | uS/STEP | 30 |
| 196 | uS/STEP | 33 |
| 200 | uS/STEP | 29 |

TABLE X

INSTRUCTION TIME = 4 uS
FREQUENCY TOLERANCE = 1%

| COLUMN 3 1477 | | ROW 2 770 |
|---|---|---|
| 68 | uS/STEP | 94.99999 |
| 72 | uS/STEP | 90 |
| 76 | uS/STEP | 85 |
| 80 | uS/STEP | 81 |
| 84 | uS/STEP | 77 |
| 88 | uS/STEP | 66 |
| 92 | uS/STEP | 78 |
| 96 | uS/STEP | 74 |
| 100 | uS/STEP | 58 |
| 104 | uS/STEP | 62 |
| 108 | uS/STEP | 60 |
| 112 | uS/STEP | 58 |
| 116 | uS/STEP | 50 |
| 120 | uS/STEP | 54 |
| 124 | uS/STEP | 52 |
| 128 | uS/STEP | 56 |
| 132 | uS/STEP | 44 |
| 136 | uS/STEP | 57 |
| 140 | uS/STEP | 46 |
| 144 | uS/STEP | 45 |
| 148 | uS/STEP | 48 |
| 152 | uS/STEP | 47 |
| 156 | uS/STEP | 46 |
| 160 | uS/STEP | 49 |
| 164 | uS/STEP | 48.00001 |
| 168 | uS/STEP | 46 |
| 172 | uS/STEP | 45 |
| 176 | uS/STEP | 33 |
| 180 | uS/STEP | 36 |
| 184 | uS/STEP | 35 |
| 188 | uS/STEP | 38 |
| 192 | uS/STEP | 37 |
| 196 | uS/STEP | 33 |

TABLE X-continued

INSTRUCTION TIME = 4 uS
FREQUENCY TOLERANCE = 1%

| COLUMN 3 1477 | | ROW 2 770 |
|---|---|---|
| 200 | uS/STEP | 29 |

TABLE XI

INSTRUCTION TIME = 4 uS
FREQUENCY TOLERANCE = 1%

| COLUMN 3 1477 | | ROW 3 852 |
|---|---|---|
| 68 | uS/STEP | 60 |
| 72 | uS/STEP | 57 |
| 76 | uS/STEP | 31 |
| 80 | uS/STEP | 51 |
| 84 | uS/STEP | 28 |
| 88 | uS/STEP | 73 |
| 92 | uS/STEP | 70 |
| 96 | uS/STEP | 49 |
| 100 | uS/STEP | 41 |
| 104 | uS/STEP | 62 |
| 108 | uS/STEP | 38 |
| 112 | uS/STEP | 21 |
| 116 | uS/STEP | 56 |
| 120 | uS/STEP | 34 |
| 124 | uS/STEP | 19 |
| 128 | uS/STEP | 32 |
| 132 | uS/STEP | 31 |
| 136 | uS/STEP | 30 |
| 140 | uS/STEP | 46 |
| 144 | uS/STEP | 45 |
| 148 | uS/STEP | 16 |
| 152 | uS/STEP | 27 |
| 156 | uS/STEP | 41 |
| 160 | uS/STEP | 40 |
| 164 | uS/STEP | 25 |
| 168 | uS/STEP | 14 |
| 172 | uS/STEP | 41 |
| 176 | uS/STEP | 40 |
| 180 | uS/STEP | 36 |
| 184 | uS/STEP | 35 |
| 188 | uS/STEP | 25 |
| 192 | uS/STEP | 37 |
| 196 | uS/STEP | 12 |
| 200 | uS/STEP | 32 |

TABLE XII

INSTRUCTION TIME = 4 uS
FREQUENCY TOLERANCE = 1%

| COLUMN 3 1477 | | ROW 4 941 |
|---|---|---|
| 68 | uS/STEP | 55 |
| 72 | uS/STEP | 52 |
| 76 | uS/STEP | 49 |
| 80 | uS/STEP | 80 |
| 84 | uS/STEP | 44 |
| 88 | uS/STEP | 42 |
| 92 | uS/STEP | 52 |
| 96 | uS/STEP | 39 |
| 100 | uS/STEP | 37 |
| 104 | uS/STEP | 36 |
| 108 | uS/STEP | 44 |
| 112 | uS/STEP | 33 |
| 116 | uS/STEP | 32 |
| 120 | uS/STEP | 31 |
| 124 | uS/STEP | 30 |
| 128 | uS/STEP | 29 |
| 132 | uS/STEP | 28 |
| 136 | uS/STEP | 35 |
| 140 | uS/STEP | 34 |
| 144 | uS/STEP | 26 |
| 148 | uS/STEP | 25 |
| 152 | uS/STEP | 42 |
| 156 | uS/STEP | 24 |
| 160 | uS/STEP | 40 |
| 164 | uS/STEP | 29 |

TABLE XII-continued

INSTRUCTION TIME = 4 uS
FREQUENCY TOLERANCE = 1%

| COLUMN 3 | | ROW 4 |
|---|---|---|
| 1477 | | 941 |
| 168 | uS/STEP | 22 |
| 172 | uS/STEP | 43 |
| 176 | uS/STEP | 21 |
| 180 | uS/STEP | 38 |
| 184 | uS/STEP | 26 |
| 188 | uS/STEP | 20 |
| 192 | uS/STEP | 39 |
| 196 | uS/STEP | 19 |
| 200 | uS/STEP | 29 |

FIG. 4 shows the two components from FIG. 2 shifted in frequency so as to match each other at a sampling rate of 120 microseconds. More specifically, the 697 Hz signal has been shifted in frequency to 694.4445 Hz, and the 1209 Hz signal has been shifted in frequency to 1215.287 Hz. The two components are within 0.3% and 0.6%, respectively, of their original frequencies. This shift in frequencies eliminates the small end discontinuities which would occur if the end points of the two components did not occur exactly in synchronism with the sampling rate.

FIG. 5 shows the two components of FIG. 4 as they would appear if stored individually at the 120 microsecond sampling rate. Here it is assumed that the sampled waveform is stored with a one half sample time phase shift so that one half of each end sample makes up part of the reverse direction scan.

FIG. 6 shows the summed DTMF signal derived from the two components shown in FIG. 4 and the final twenty-five step stored table, each step being one byte or 8-bits.

The following is a listing for a BASIC program which calculates and prints the desired frequencies, number of steps, real time, actual resultant frequencies, number of half periods, and precentage of frequency error, given the step time and maximum allowable frequency error. The flowchart of FIG. 10 corresponds to the program steps of Program 2.

PROGRAM 2

```
10  DIM FREQ(10)
20  DATA 697,770,852,941,1209,1336,1477
30  FOR X=1 TO 7 : READ FREQ(X) : NEXT X
40  IT=.000004 : LPRINT "INSTRUCTION TIME =";
    IT*1000000!;"uS"
50  IPS=28:ST=IPS*IT:LPRINT ST*1000000!;"uS/STEP"
60  IT=.000004:LPRINT "INSTRUCTION TIME = 4uS"
70  FT=1 : LPRINT "FREQUENCY
    TOLERANCE=";FT;"%"
80  FOR R=1 TO 4 : FOR C=5 TO 7
90  LPRINT "ROW";R,"COLUMN";C-4
100 LPRINT FREQ(R),FREQ(C)
110 ST=IPS*IT : TBYTES=0 : FLAG2=0
120 FLAG=0 : FOR HP1=1 TO 200*ST*FREQ(R) : IF
    FLAG=1 THEN 220
130 T=HP1/(FREQ(R)*2) : TST=(INT((T/ST)+.5)*ST)
140 F1=1/(2*TST/HP1) : EF1=(INT(1000*(FREQ(R)-F1)
    /FREQ(R)))/10)
150 IF ABS(EF1)>FT THEN 220
160 HP2=INT((TST*2*FREQ(C))+.5)
170 F2=1/(2*TST/HP2) : EF2=(INT(1000*((FREQ(C)-F2)
    /FREQ(C)))/10)
180 IF ABS(EF2)>FT THEN 220
190 FLAG=1 : FLAG2=FLAG2+1 : TBYTES=TBYTES+
    TST/ST
200 ZT=INT(TST*1000000!)
210 LPRINT TST/ST;"STEPS";ZT;"uSEC" : LPRINT F1;
    HP1;F2;HP2;EF1;EF2
220 NEXT HP1 : LPRINT : NEXT C : NEXT R : END
```

Tables XIII and XIV show two sample runs for 112 and 120 microsecond steps.

TABLE XIII

INSTRUCTION TIME = 4 uS
112 uS/STEP
INSTRUCTION TIME = 4 uS
FREQUENCY TOLERANCE = 1%

| ROW 1 | | COLUMN 1 | | | |
|---|---|---|---|---|---|
| 697 | | 1209 | | 70 STEPS 7840 uSEC | |
| 701.5306 | 11 | 1211.735 | 19 | | −.7 −.3 |
| ROW 1 | | COLUMN 2 | | | |
| 697 | | 1336 | | 64 STEPS 7168 uSEC | |
| 697.5447 | 10 | 1325.335 | 19 | | −.1 .7 |
| ROW 1 | | COLUMN 3 | | | |
| 697 | | 1477 | | 45 STEPS 5040 uSEC | |
| 694.4445 | 7 | 1488.095 | 15 | .3 −.8 | |
| ROW 2 | | COLUMN 1 | | | |
| 770 | | 1209 | | 41 STEPS 4592 uSEC | |
| 762.1951 | 7 | 1197.735 | 11 | 1 .9 | |
| ROW 2 | | COLUMN 2 | | | |
| 770 | | 1336 | | 64 STEPS 7168 uSEC | |
| 767.2991 | 11 | 1325.335 | 19 | | .3 .7 |
| ROW 2 | | COLUMN 3 | | | |
| 770 | | 1477 | | 58 STEPS 6496 uSEC | |
| 769.7044 | 10 | 1462.438 | 19 | | 0 .9 |
| ROW 3 | | COLUMN 1 | | | |
| 852 | | 1209 | | 26 STEPS 2912 uSEC | |
| 858.5165 | 5 | 1201.923 | 7 | −.8 .5 | |
| ROW 3 | | COLUMN 2 | | | |
| 852 | | 1336 | | 37 STEPS 4144 uSEC | |
| 844.5947 | 7 | 1327.22 | 11 | .8 .6 | |
| ROW 3 | | COLUMN 3 | | | |
| 852 | | 1477 | | 21 STEPS 2352 uSEC | |
| 850.3401 | 4 | 1488.095 | 7 | .1 −.8 | |
| ROW 4 | | COLUMN 1 | | | |
| 941 | | 1209 | | 33 STEPS 3696 uSEC | |
| 946.9697 | 7 | 1217.533 | 9 | −.7 −.8 | |
| ROW 4 | | COLUMN 2 | | | |
| 941 | | 1336 | | 47 STEPS 5264 uSEC | |
| 949.848 | 10 | 1329.787 | 14 | −1 .4 | |
| ROW 4 | | COLUMN 3 | | | |
| 941 | | 1477 | | 33 STEPS 3696 uSEC | |
| 946.9697 | 7 | 1488.095 | 11 | −.7 −.8 | |

TABLE XIV

INSTRUCTION TIME = 4 uS
120 uS/STEP
INSTRUCTION TIME = 4 uS
FREQUENCY TOLERANCE = 1%

| ROW 1 | | COLUMN 1 | | | |
|---|---|---|---|---|---|
| 697 | | 1209 | | 24 STEPS 2880 uSEC | |
| 694.4445 | 4 | 1215.278 | 7 | .3 −.6 | |
| ROW 1 | | COLUMN 2 | | | |
| 697 | | 1336 | | 66 STEPS 7920 uSEC | |
| 694.4445 | 11 | 1325.758 | 21 | | .3 .7 |
| ROW 1 | | COLUMN 3 | | | |
| 697 | | 1477 | | 42 STEPS 5039 uSEC | |
| 694.4445 | 7 | 1488.095 | 15 | .3 −.8 | |
| ROW 2 | | COLUMN 1 | | | |
| 770 | | 1209 | | 38 STEPS 4560 uSEC | |
| 767.5439 | 7 | 1206.14 | 11 | .3 .2 | |
| ROW 2 | | COLUMN 2 | | | |
| 770 | | 1336 | | 65 STEPS 7800 uSEC | |
| 769.2308 | 12 | 1346.154 | 21 | | 0 −.8 |
| ROW 2 | | COLUMN 3 | | | |
| 770 | | 1477 | | 54 STEPS 6480 uSEC | |
| 771.605 | 10 | 1466.05 | 19 | | −.3 .7 |
| ROW 3 | | COLUMN 1 | | | | |

TABLE XIV-continued

INSTRUCTION TIME = 4 uS
120 uS/STEP
INSTRUCTION TIME = 4 uS
FREQUENCY TOLERANCE = 1%

| 852 | | 1209 | | 59 STEPS 7080 uSEC | |
|---|---|---|---|---|---|
| 847.4576 | 12 | 1200.565 | 17 | .5 | .6 |
| ROW 3 | | COLUMN 2 | | | |
| 852 | | 1336 | | 34 STEPS 4079 uSEC | |
| 857.8432 | 7 | 1348.039 | 11 | −.7 | −1 |
| ROW 3 | | COLUMN 3 | | | |
| 852 | | 1477 | | 34 STEPS 4079 uSEC | |
| 857.8432 | 7 | 1470.588 | 12 | −.7 | .4 |
| ROW 4 | | COLUMN 1 | | | |
| 941 | | 1209 | | 31 STEPS 3720 uSEC | |
| 940.8602 | 7 | 1209.678 | 9 | 0 | −.1 |
| ROW 4 | | COLUMN 2 | | | |
| 941 | | 1336 | | 22 STEPS 2639 uSEC | |
| 946.9698 | 5 | 1325.758 | 7 | −.7 | .7 |
| ROW 4 | | COLUMN 3 | | | |
| 941 | | 1477 | | 31 STEPS 3720 uSEC | |
| 940.8602 | 7 | 1478.495 | 11 | 0 | −.2 |

The following is a listing for a BASIC program which calculates and prints the value of each of the components and the summed "7-bit normalized" (0–127) amplitude for storing as the final table. The flowchart of FIG. 11 corresponds to the program steps of Program 3.

PROGRAM 3

```
5   INPUT "SAMPLE RATE IN uS =";SR:SR=
    SR/1000000!
10  INPUT "FREQUENCY 1=? ";FREQ(1)
20  INPUT "FREQUENCY 2=? ";FREQ(2)
40  INPUT "NUMBER OF SAMPLES =? 37 ;NS
45  LPRINT FREQ(1);FREQ(2);SR;"SEC/STEP";
    NS:" STEPS"
50  FOR T=0 TO NS*SR STEP SR
60  C1=COS(FREQ(1)*2*3.1415926#*T)
70  C2=COS(FREQ(2)*2*3.1415926#*T)
80  CT=C1+C2
90  BCT=INT((CT*31.5)+64.5)
100 LPRINT INT((T/SR)+.5);" ";C1,C2,BCT
105 PRINT INT((T/SR+.5);" ";C1,C2,BCT
110 NEXT T
120 LPRINT CHR$(12)
130 GOTO 10
```

Table XV shows a smaple run for a DTMF "1" digit at a sampling rate of 120 microseconds.

TABLE XV

| | 694.4445 | 1215.278 | .00012 SEC/ STEP 24 | STEPS |
|---|---|---|---|---|
| 0 | 1 | 1 | 127 | |
| 1 | .8660254 | | .6087613 | 110 |
| 2 | .5000001 | | −.2588192 | 72 |
| 3 | 0 | −.9238799 | 35 | |
| 4 | −.5000003 | | −.8660249 | 21 |
| 5 | −.8660256 | | −.130525 | 33 |
| 6 | −1 | .7071075 | 55 | |
| 7 | −.8660256 | | .9914448 | 68 |
| 8 | −.5000003 | | .4999993 | 64 |
| 9 | 1.748456E-07 | | −.3826848 | 52 |
| 10 | .5000001 | | −.9659263 | 49 |
| 11 | .8660254 | | −.7933524 | 66 |
| 12 | 1 | 1.605357E-06 | | 96 |
| 13 | .8660257 | | .7933546 | 116 |
| 14 | .5000004 | | .9659254 | 110 |
| 15 | 5.617606E-07 | | .3826817 | 76 |
| 16 | −.4999993 | | −.5000016 | 32 |
| 17 | −.8660249 | | −.9914451 | 5 |
| 18 | −1 | −.707106 | 10 | |
| 19 | −.8660257 | | .1305275 | 41 |
| 20 | −.5000006 | | .8660261 | 76 |
| 21 | −7.490141E-07 | | .9238791 | 93 |
| 22 | .4999993 | | .2588177 | 88 |
| 23 | .8660249 | | −.6087625 | 72 |
| 24 | 1 | −1 | 64 | |

Figure 7:
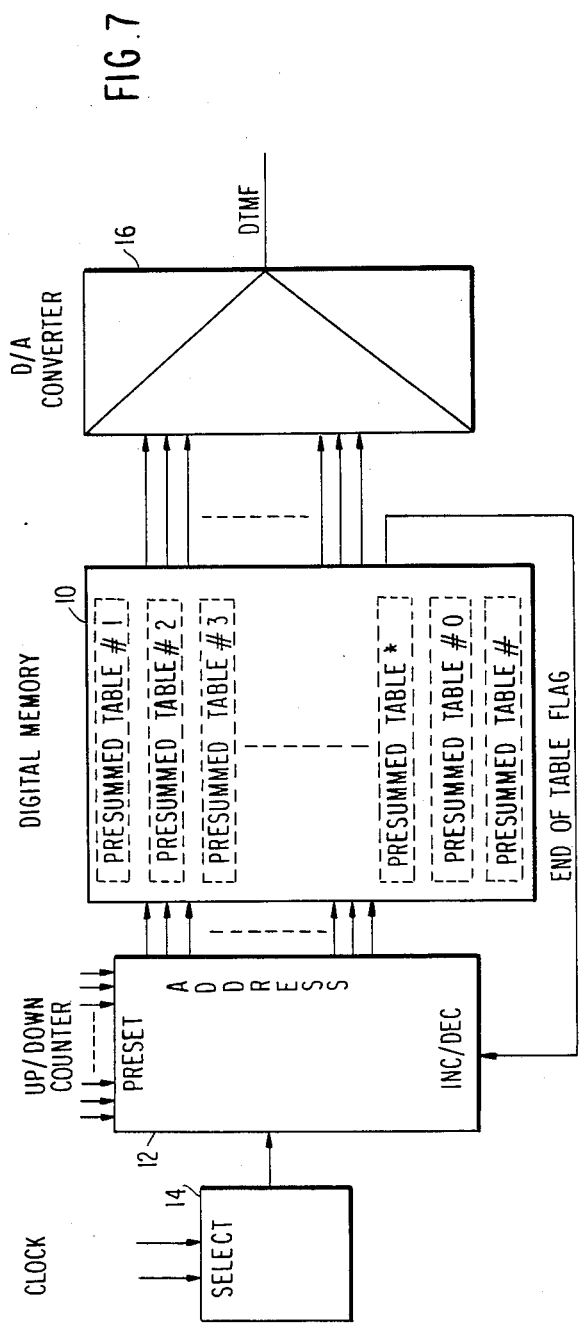
FIG. 7 is a block diagram showing the hardware used to practice the invention.

Turning now to FIG. 7, there is shown a block diagram of hardware which may be used to practice the invention. The digital memory 10 contains twelve pre-summed tables for each of the DTMF digits "0" to "9" and "*" and "#". It will be noted by the dotted lines which represent each of the tables, that the tables are of different lengths. An up/down counter 12 is used to address the digital memory 10. A single counter 12 can be used to address each table in memory 10 by presetting the counter to the starting address for the desired table. The counter is then incremented by the clock 14 at a selected clock frequency until the entire table has been scanned at which time an end of table flag is output from the memory 10 to the counter 12. This end of table flag toggles the counter to decrement until the entire table has been scanned in the opposite direction at which time the process repeats.

Data is stored in the memory 10 in byte segments of 8-bits each. Seven bits of each byte represent sampled amplitude data, and the eighth bit is reserved for the end-of-table flag. The seven bits of data of each byte output from the memory 10 for each clock pulse from clock 14 are supplied to a digital-to-analog converter 16 which produces an analog voltage signal corresponding to the desired DTMF signal. The clock 14 may have one or two inputs to select the clock frequency for the readout of the table for the desired DTMF signal. One input allows the selection of one of two scan rate frequencies, while two inputs allow the selection of up to four scan rate frequencies. While each table does not need its own scan rate, it is possible to optimize the system by grouping the tables into two or at most three different scan rates.

Figure 8:
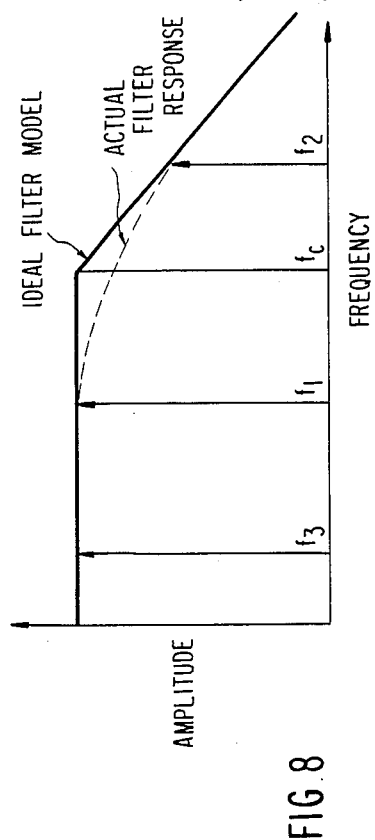
FIG. 8 is a graph showing the frequency response characteristics of an ideal low pass filter and an actual low pass filter.

The output of the digital-to-analog converter 16 must be filtered by a low pass filter in order to reduce the relative amplitude of extraneous signals produced by digital sampling. FIG. 8 shows the relative frequency response characteristics of an ideal filter and a typical actual filter. Given two tones $f_3$ and $f_1$ and an extraneous signal $f_2$, the filter will attenuate $f_2$ more relative to both $f_1$ and $f_3$ if the filter's cut off frequency, $f_c$, is allowed to move closer to $f_1$. However, moving $f_c$ closer to $f_1$ will attenuate $f_1$ with respect to $f_3$. This is not permitted by the standard defined by AT&T PUB 61100 which requires that not only must the maximum difference in levels between the two components be no more than 4 dB, but the level of the high-frequency component, $f_1$, must be equal to or exceed the level of the low-frequency component, $f_3$.

According to one aspect of the invention, $f_c$ is moved closer to $f_1$ and, to compensate for this, $f_1$ is preweighted so that the final DTMF signal meets the twist specification defined by AT&T PUB 61100. Each frequency pair requires different and unique preweighting of the high-frequency component of the pair since all of the frequency pairs are filtered by the same low pass filter. The exact preweighting needed for each tone pair can be calculated from the filter characteristics, or tables can be run with no weighting, the results measured for a specific filter and then preweighting determined to compensate for actual circuit performance. As one example, line 80 of the BASIC program listing above which calculates and prints the value of each of the components and the summed "7-bit normalized" (0–127) amplitude for storing as the final table can be modified as follows:

$$80\ CT = C1\frac{2}{3} + C2\frac{4}{3}$$

While the invention has been disclosed in terms of a preferred embodiment, those skilled in the art will recognize that modifications and variations can be made in the practice of the invention without departing from the scope of the invention as defined in the appended claims.

Having thus described my invention, what I claim as new and desire to secure by Letters Patent is as follows:

1. A method of generating a predefined dual tone multifrequency signal comprising two non-harmonically related frequency components, comprising the steps of:
   (a) generating a sampling signal having a sampling frequency;
   (b) generating memory addresses in response to said sampling signal for reading digital data representing the sum of samples of said frequency components from a memory device bidirectionally between address limits repeatedly, each of said components having a commom harmonic fundamental frequency, and each of said frequency components being within a predetermined tolerance of respective nominal frequencies; and
   (c) converting said digital data read from said memory device into an analog signal representing the sum of said frequency components.

2. The method recited in claim 1 wherein said data representative of said predefined dual tone multifrequency signals having a common sampling frequency are grouped.

3. The method recited in claim 1 wherein the samples of the summed signal for each of said predefined dual tone multifrequency signals are stored in different length tables in said digital memory, the lengths of each of said tables being optimized for bidirectional fixed rate scanning.

4. The method recited in claim 1 further comprising the steps of:
   filtering said analog signal with a low pass filter to reduce unwanted high frequency components contained therein, wherein
   said data read from said memory device represents the sum of frequency components preweighted with respect to one another to optimize the performance of said low pass filter.

5. A signal generator for generating a plurality of predefined dual tone multifrequency signals, each of said signals comprising two non-harmonically related frequency components, comprising:
   digital memory means for storing digital data in a plurality of look up tables, each table storing samples of a respective one of said dual tone multifrequency signals produced by summing as said frequency components a tone pair, the frequencies of which have been adjusted within a predetermined tolerance from respective nominal frequencies so that their peaks are time coincident within a given number of cycles;
   clock means for generating scanning pulses at a fixed frequency selected to be coincident with the occurrence of time coincident peaks of said tone pair;
   scanning means responsive to said scanning pulses for bidirectionally scanning a selected table in said digital memory means to read out said samples in repeating sequences; and
   digital-to-analog converter means for receiving said read out samples and converting them to an analog dual tone multifrequency signal.

6. The signal generator recited in claim 5 wherein said clock means generates scanning pulses at more than one fixed frequency, said clock means further including means for selecting the frequency of the scanning pulses.

7. The signal generator recited in claim 5 wherein said scanning means includes an up/down counter which is preset with the address of a desired table in said digital memory means, each said table including an end-of-table flag for changing the direction of counting of said counter, thereby allowing said repeating sequences.

8. A method of generating data representative of a predefined dual tone multifrequency signal comprising two non-harmonically related frequency components, comprising the steps of:
   (a) determining a value for total time when each of a given number of time intervals corresponds to the half-period of a first nominal frequency;
   (b) determining the total integer number of samples at a given sampling rate which occur in said total time;
   (c) converting said total integer number of samples to a numeric representation of a first frequency component;
   (d) repeating steps a through c and varying said given number of time intervals until said first numeric representation of said first frequency component is within a predetermined tolerance of said first nominal frequency;
   (e) calculating the total integer number of half periods of a second nominal frequency which occur in said total time;
   (f) converting said total integer number of half periods of said second nominal frequency to a second frequency component;
   (g) repeating steps a–f and varying said given number of time intervals until said first frequency component and said second frequency component are within said predetermined tolerance of said respective first and second nominal frequencies;
   (h) generating digital data representative of a sinusoidal-type signal for each of said frequency components for each of said integer number of samples and combining said digital data at respective ones of said integer number of samples; and
   (i) programming a memory device with said combined digital data, said digital data forming a table within said memory device, said table having a number of elements equal to said integer number of samples plus 1; wherein
   said first and second frequency components have a common harmonic fundamental frequency.

9. The method of claim 8 wherein said first nominal frequency is selected from a first plurality of predetermined nominal frequencies and said second nominal frequency is selected from a second plurality of predetermined nominal frequencies, said nominal frequencies being unrelated to each other harmonically.

10. The method of claim 9 wherein each frequency of said first plurality of predetermined nominal frequencies is paired with each frequency of said second plurality of predetermined nominal frequencies, each pair of nominal frequencies being used thereafter to generate data representing respective frequency components within said tolerance of said respective nominal frequencies.

11. The method of claim 10 wherein a first pair of said nominal frequencies different from a second pair of said nominal frequencies, has a sampling rate different from that of said second pair of nominal frequencies.

12. The method of claim 11 further comprising the step of:
grouping said data representative of predetermined dual tone multifrequency signals having the same sampling frequencies.

13. The method of claim 8 wherein said sinusoidal-type signal is a cosine signal.

14. The method of claim 13 further comprising the step of:
normalizing said data to a predetermined range of values.

15. The method of claim 14 further comprising the step of:
preweighting the value of the data of one of said frequency components relative to the other of said frequency components.

16. The method of claim 15 wherein the step of preweighting is performed by calculating the optimum preweighting for each of said frequency components.

17. The method of claim 15 wherein the step of preweighting is performed by the steps of:
generating said predefined dual tone multifrequency signals without preweighting;
measuring the analog signals produced without preweighting; and
adjusting the relative levels of each of said frequency components to compensate for actual circuit performance, thereby producing said preweighted values.

18. A method of generating data representative of predefined dual tone multifrequency signals comprising two non-harmonically related frequency components comprising the steps of:
adjusting the frequencies of each of said frequency components within a predetermined tolerance to form time coincident peaks within a given number of cycles, whereby each of said components has a common fundamental frequency;
combining said adjusted frequency components; and
storing a digital representation of said combined frequency components in a digital memory.

19. Apparatus for producing one of a plurality of dual tone multifrequency signals in response to a digital input signal, comprising:
clock means for generating a clock signal;
memory address generator means having an input for receiving said digital input signal and said clock signal, and an output at which a digital address signal is developed, said address generator means generating addresses in response to said clock signal;
memory means having stored therein digital data representative of combined samples of each of two frequency components, each of said frequency components being a harmonic of a common fundamental frequency, each of said frequency components being within a given tolerance of a respective predetermined nominal frequency, said memory means having an input coupled to said address generator means and producing at an output digital data representative of samples of said dual tone multifrequency signal; and
digital-to-analog converter means coupled to said memory means for receiving said digital data and producing at an output an analog dual tone multifrequency signal.

20. The apparatus of claim 19 wherein said memory address generator means is a presettable counter.

21. The apparatus of claim 20 wherein said counter produces addresses which cause said memory means to be scanned bidirectionally.

22. The apparatus of claim 19 wherein said predetermined nominal frequency is one of a plurality of standard frequencies.

23. The apparatus of claim 22 wherein said nominal frequency is one of the set of standard telephone signalling frequencies including 697 Hz, 770 Hz, 852 Hz, 914 Hz, 1209 Hz, 1336 Hz, and 1477 Hz.

24. The apparatus of claim 23 further including a filter coupled to said output of said digital to analog converter for reducing unwanted high frequency components in said dual tone multifrequency signal.

* * * * *